(12) United States Patent  
Jung et al.

(10) Patent No.: US 6,956,616 B2  
(45) Date of Patent: Oct. 18, 2005

(54) APPARATUS FOR FACILITATING VIEWING BY HUMAN EYE

(75) Inventors: Christopher C. Jung, Mission Viejo, CA (US); Richard A. Buck, Laguna Hills, CA (US)

(73) Assignee: Verseye, Inc., Mission Viejo, CA (US)

( * ) Notice: Subject to any disclaimer, the term of this patent is extended or adjusted under 35 U.S.C. 154(b) by 825 days.

(21) Appl. No.: 09/827,135

(22) Filed: Apr. 5, 2001

(65) Prior Publication Data

US 2002/0145813 A1 Oct. 10, 2002

(51) Int. Cl.$^7$ .............................................. H04N 5/225
(52) U.S. Cl. ........................ 348/376; 348/63; 348/370
(58) Field of Search .......................... 348/63, 370, 552, 348/373, 376, 211.2, 231.3; 382/313, 314, 382/315; 358/473, 474, 483; 704/3; 235/472.01

(56) References Cited

U.S. PATENT DOCUMENTS

| | | | |
|---|---|---|---|
| 3,993,865 A | 11/1976 | Browne et al. | |
| 4,227,209 A | 10/1980 | Warner | |
| 5,027,149 A * | 6/1991 | Hoshino et al. | ............... 396/56 |
| 5,633,674 A | 5/1997 | Trulaske et al. | |
| 5,748,228 A * | 5/1998 | Kobayashi et al. | ............ 348/63 |
| 5,821,523 A * | 10/1998 | Bunte et al. | ............ 235/472.01 |
| 5,825,502 A | 10/1998 | Mayer | |
| 6,384,863 B1 * | 5/2002 | Bronson | ....................... 348/373 |
| 6,532,039 B2 * | 3/2003 | Anderson | ................ 348/231.3 |
| 6,747,692 B2 * | 6/2004 | Patel et al. | ............... 348/211.2 |
| 2001/0056342 A1 * | 12/2001 | Piehn et al. | .................... 704/3 |

* cited by examiner

Primary Examiner—Tuan Ho  
Assistant Examiner—Heather R. Long  
(74) Attorney, Agent, or Firm—Stetina Brunda Garred & Brucker

(57) ABSTRACT

A hand-held, portable apparatus has been disclosed to facilitate the viewing of an object by the human eye. The apparatus provides an electronic camera unit disposed on a holder mechanism and in electrical communication with an image processor module to capture the image of an object and format the image for display on a display device also disposed on the holder mechanism. At least one user-interfaced control mechanism is also disposed on the holder mechanism and in electrical communication with the image processor module for controlling the operations of the module to regulate display of the image by the display device. In this way the viewing of an object by the human eye is facilitated by the use of camera and the image enhancing features of the image processor module.

27 Claims, 2 Drawing Sheets

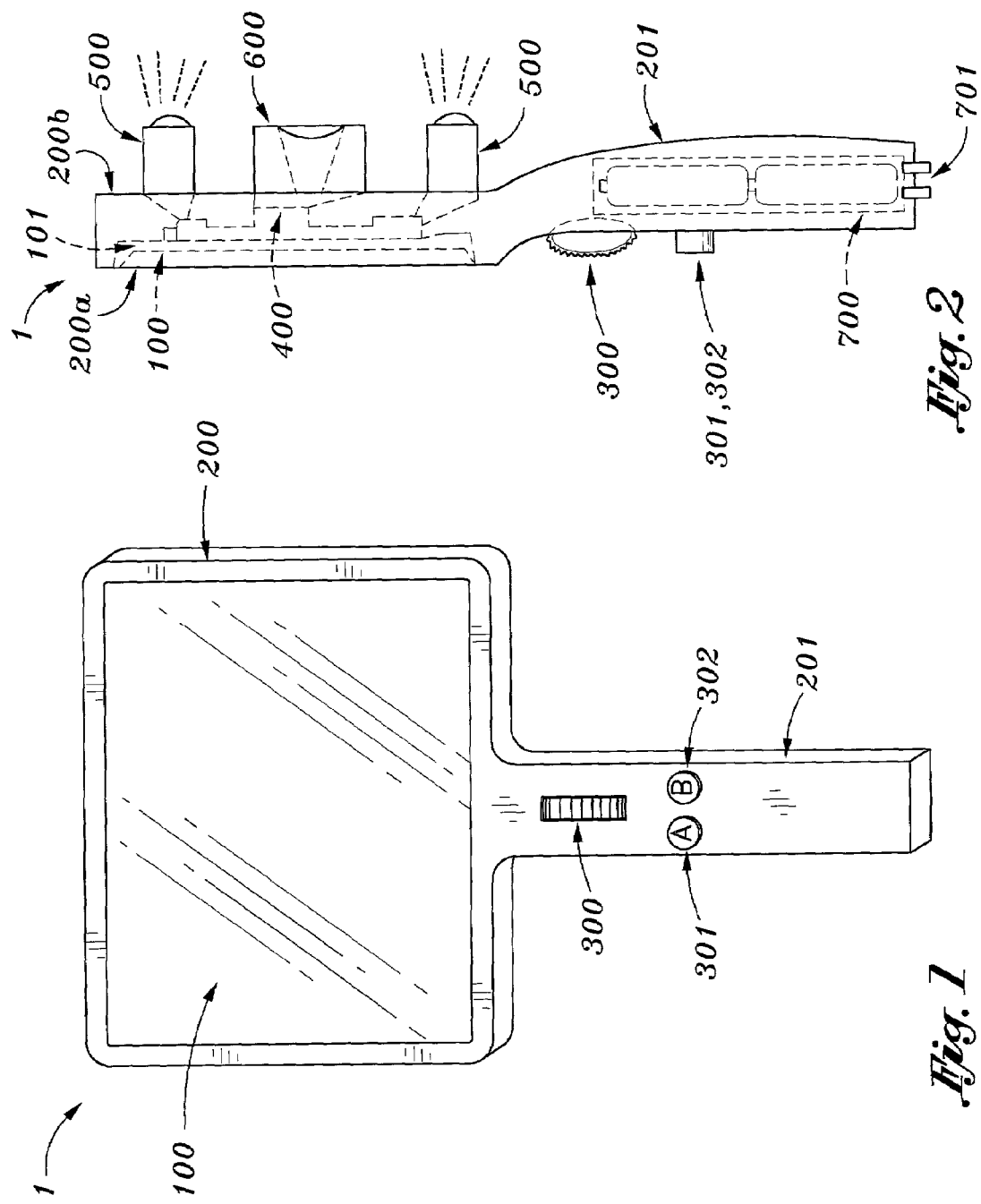

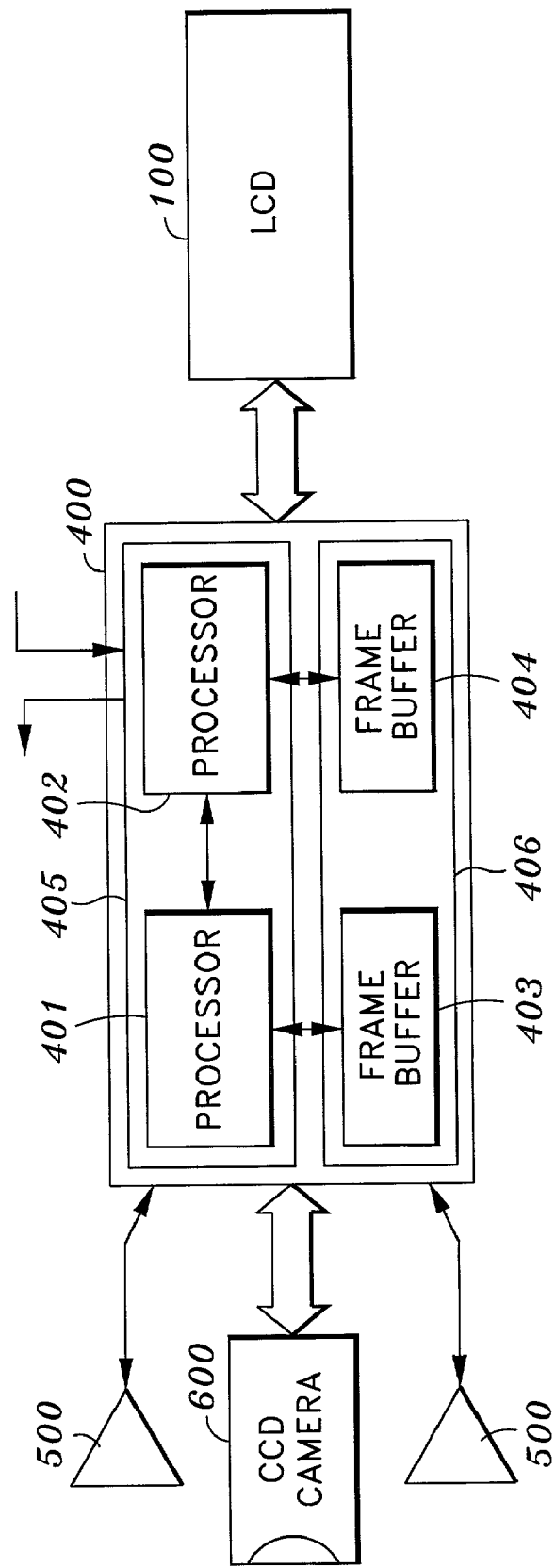

APPARATUS FOR FACILITATING VIEWING BY HUMAN EYE

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention is generally directed to viewing apparatus. More particularly, the present invention is directed to apparatus for facilitating viewing of an object by human eye.

BACKGROUND OF THE INVENTION

The use of viewing aids for the human eye has long been known in the art. Presently, a number of viewing aids utilize various image magnification and enhancement to better aid the human eye in viewing of a desired object, person or text. These existing devices, however, suffer from several shortcomings that hinder their effectiveness or a viewer's desire to use them.

Generally, in their most common form, these devices utilize an optical lens such as a magnifying glass to enlarge the view of an object as perceived by the human eye. Due to the convex nature of the lens, however, only a small portion of the lens may be effectively utilized for focusing on an object without undesirable shifting of the object from view, resulting in image stabilization problems that can be quite distracting to the user. Achieving focusing is also an issue which requires the user to physically move the glass in order to obtain a focused image. The optical lens also requires ample lighting for proper viewing. In addition, a typical magnifying glass only magnifies, and provides no additional features such as color contrast or other forms of image enhancement.

Other forms of magnifying glasses have tried to address the illumination issue by use of a lamp installed on some frame portion of the magnifying glass. This however, suffers from the shortcomings of loss of brightness from the light source as the gain to the image size increases. Furthermore, the provided illumination oftentimes lacks uniformity and typically cannot be adjusted in intensity. In addition, the foregoing problems of achieving focusing and lack of additional features such as color contrast or other forms of image enhancement still remain at issue.

A third form of visual aid is the use of electronic camera in conjunction with a separate video monitor. Disadvantages associated with this approach are the lack of portability of the whole system, complicated connections and setups, and excessive cost. In addition, human physiology may also be compromised in form of neck and back strain, and even nausea from visual disorientation as a user is required to constantly shift focus from the camera to the video monitor. In addition, the camera unit in this setting is fixed in orientation, thus requiring that the object be brought to the instruction, which may not always be possible or convenient.

It is therefore an object of the present invention to provide an apparatus that is small in size, portable, and capable of providing illumination and a variety of image enhancement and magnification features to facilitate the viewing of an object by human eye.

SUMMARY OF THE INVENTION

The apparatus further includes at least one image processor module in electrical communication with the camera unit to format the recorded image for display, at least one image display device having a display region, the display device disposed on the holder mechanism second surface and in electrical communication with the image processor module to display the formatted image on the display region, and at least one user-interfaced control mechanism disposed on the holder mechanism and in electrical communication with the image processor module for controlling the operations of the module to regulate display of the image by the display device.

A more detailed understanding of these features, and of additional features, objects, and advantages of the present invention will be provided to those skilled in the art from a consideration of the following Detailed Description of the Invention, taken in conjunction with the accompanying Drawings, which will now first be described briefly.

BRIEF DESCRIPTION OF THE DRAWINGS

FIG. 1 is a three dimensional front view of an exemplary embodiment of the present invention.

FIG. 2 is a side sectional view of the exemplary embodiment of the present invention illustrated in FIG. 1 and illustrating additional features thereof.

FIG. 3 is a circuit block diagram illustrating the electronic layout and operations of the image processor of the present invention.

DETAILED DESCRIPTION OF THE INVENTION

Referring more particularly to the Drawings, the present invention is directed to facilitating viewing of an object by human eye. This is accomplished in accordance with the teachings of the present invention by providing an apparatus having an electronic display device that displays images of an object captured by a camera incorporated in the apparatus and formatted by an image processing unit also located within the apparatus. In this way, the formatted images can be viewed by the user at virtually any desired level of magnification and enhancement simply by controlling the image processing unit of the apparatus.

Turning now to the Drawings, FIG. 1 illustrates a three dimensional front view of an exemplary embodiment of the present invention. As shown, the viewing device 1 in part includes a display region 100 disposed on the support portion 200, along with the user-interface control mechanisms 300, 301 and 302 disposed along handle portion 201. As explained in more detail in conjunction with FIG. 2 below, the control mechanisms 300, 301 and 302 provide various ways for a user to desirably modify and manipulate the images shown on display region 100.

FIG. 2 provides a cross-sectional view further illustrating the additional understanding and features of an exemplary embodiment of the present invention. As shown in FIG. 2, the viewing device 1 includes a support portion 200 having opposing surfaces 200a and 200b. At least one light source 500 is disposed on one of the holder mechanism's opposing surfaces, such as opposing surfaces 200b, to illuminate at least a portion of a desired object to be viewed.

The viewing device 1 also includes electronic camera unit 600 disposed on the same opposing surface as the light source 500, to capture at least one image of the object, desirably as illuminated by the light source 500. Once an image of the object is captured, it is transmitted to the image processor module 400 which formats and enhances the captured image for display on the display unit 100 of the display device 101 located on the surface opposite to that of the camera unit 600. The operations of the image processor module 400 are explained in more detail in conjunction with FIG. 3 below.

The viewing device 1 further includes at least one of user-interface control mechanisms 300, 301 or 302 disposed on the apparatus, such as on the handle portion 201, and in electrical communication with the image processor module 400 for controlling the operations of module 400 to regulate display of the image by the display device 101 by a user. The user can regulate the display device 101 in various ways that include but are not limited to adjusting the magnification or enhancement of the displayed image on display region 100, changing preferences such as auto power-off time, saving and recalling stored images as well as adjusting the illumination intensity of the light source 500 and the focusing operations of the camera unit 600.

In an exemplary embodiment of the present invention, the viewing device 1 includes an internal power source 700, such as a recharge able battery, that is housed in the handle portion 201 or support portion 200 to provide operational power to at least one of the camera unit 600, the image processor system 400, light sources 500 and image display device 101. External power sources such as adapters or transformers can also be connected to the viewing device 1 through power port 701 to provide power to the viewing device 1 as well as to recharge the recharge able batteries.

FIG. 3 provides a circuit block diagram illustrating in more detail the operations of the image processor module 400. As shown, the image processor module 400 includes processor system 405 and memory medium 406. The processor 405 is in electrical communication with the camera unit 600, the light sources 500, the display device 100 and the control mechanisms 300, 301 and 302 (not shown) In addition to formatting the captured image for display, the processor system 405 also monitors and controls the operations of the above components and receives operational instructions from the user via user inputs on the control mechanisms 300, 301 and 302. These instructions include but are not limited to instructions to adjust the magnification level, illumination intensity, and the focusing resolution level of the displayed image on the display region 100. In addition, the instructions may also include instructions to adjust the focusing characteristic of the camera unit 600, zoom mode, image enhancement such as color mapping, edge detection, and inverse video display, as well as the illumination intensity of the light source 500.

The processor 405 is in electrical communication with the image memory storage medium 406 for storage and retrieval of the pre-stored and/or user-inputted instructions as well as captured and formatted images.

In an exemplary embodiment of the present invention as shown in FIG. 3, the processor system 405 includes sub-processors 401 and 402 having dedicated memory storage mediums 403 and 404. In this configuration, one of the sub-processors, such as 401 is dedicated to initializing the camera unit 600 and managing the transferring of raw image data from the camera unit 600 into the memory storage medium 403. The other sub-processor, such as 402, is dedicated to receiving user instructions from the control mechanisms 300, 301 and 302 and transferring data from memory storage medium 404 into display device 100. This sub-processor also performs image modification and manipulations as data is transferred form memory storage medium 403 to memory storage medium 404. In this way, faster processing of the images and the user-inputted instructions is achieved. In addition, each of the sub-processors is provided with its own memory storage unit, such as memory storage mediums 403 and 404 to store instructions and images for that processor.

In another exemplary embodiment of the present invention, the image processing module 400 is a programmable image processing module and can receive new preprogrammed instructions such as by inclusion or interfacing with an Electrically Erasable Programmable Read Only Memory (EEPROM) unit. In addition, an optical alphanumeric character recognition module can also be included to recognize words and numbers in the image of a text. Also included is a voice synthesizer module to output sound patterns corresponding to the pronunciation of these recognized words and numbers.

Other features and functions of the image processing module 400 may include, but not limited to: image or text processing and enhancement for flat curved objects; image stabilization such as by auto focus and by auto track/cancellation of image jitter due to small band movements, focus track, auto zoom, selectable or variable zoom, freeze frame and no movement of image opposite to hand motion; color shifting; brightness and contrast enhancement; infrared photography and edge detection and line drawing conversion. In addition, the processor 405 and storage medium 406 can be any commercially available product adapted to user interfacing features of the control mechanism and having features of the control mechanism and having features of image processing, data storage and other functions performed by the image processor disclosed herein. Other image enhancement such as noise elimination, a color re-mapping, inverse video displaying, an illumination equalization mode may also be achieved by the image processing module 400. For example, the noise elimination can be achieved by filtering of undesired features of said object, while the illumination equalization can be achieved by modification of illumination brightness over a selected display area, so as to compensate for a non-ideal positioning of the light source.

Returning to FIG. 1 and FIG. 2, the user-interface control mechanisms 300, 301 and 302 are now discussed in greater detail. As illustrated, control mechanisms 301, 302 represent a manual input button for selecting at least one operation of the image processor module 400, such as adjusting the illumination on the displayed image. In an exemplary embodiment, the user may use button 301 to browse through a menu and make a selection, then use button 302 to commit that selection to the image processor module 400, such as for execution or storage. Control mechanism 300 is a finger-operated selection device that allows browsing, selecting, and committing of the operations with an adjusting rolling switch. Other equally effective finger operated selection devices such as a sliding switch (not shown) may also be used in conjunction with the present invention. In an exemplary embodiment of the present invention, a graphic user interface (GUI) device may be used, alone or in combination with the above control mechanisms for browsing, selecting and committing of the operations of the image processor module 400. The GUI device may also be displayed in a portion of the display region 100. Other control mechanisms such as a voice input device may also be used.

In an exemplary embodiment of the present invention the camera unit 600 is a charge-coupled device (CCD) camera unit and the display device 101 is a liquid crystal display (LCD) device. It should be emphasized that neither display region 100 nor the support portion 200 need be formed as the generally rectangular structure of FIG. 1 in order to come within the scope and teachings of the present invention. Rather, it is contemplated as being within the scope of the present invention to form display region 100 and the support portion 200 in a wide variety of geometric shapes ranging from simple bars and crescents through polygons, circles, and the like.

It should also be noted that only the fundamental features of viewing device 1 are illustrated in the figures. Those skilled in the art will appreciate that additional surface features, shapes, and details may be provided as desired, including projecting handling knobs, curbs, tabs, additional buttons, or the like as well as adjustable support members to hold the viewer at a fixed distance from an object thus to free the user from having to hold the device during extended viewing and reading time.

Additionally, support portion 200 and handle portion 201 can be formed of any available electrically compatible material having sufficient compressive and tensile strength to function in its intended environment as a support ground to the components of the present invention. Exemplary materials include grade metals such as stainless-steel and durable ceramics as well as grade plastics and composites. In the exemplary embodiment of the viewing device 1 shown in the figures, support portion 200 and handle portion 201 are formed of grade plastics. However, it should be emphasized that this is not a limiting feature of the present invention and that alternative materials may be utilized as appropriate.

In its simplest form, handle portion 201 is integrally fixedly disposed on a segment of support portion 200, although other methods of connection such as pins, pivots, hinges and rotational devices may also be equally used. It should also be noted that handle portion 201 is not essential to the overall operations of the present invention, with the control mechanisms 300, 301 and 302, as well as the power unit 700 and power port 701 can all be disposed on support portion 200.

Other embodiments, features, and advantages of the present invention will be apparent to those skilled in the art from a consideration of the foregoing specification as well as through practice of the invention and alternative embodiments and methods disclosed herein. Therefore, it should be emphasized that the specification and examples are exemplary only, and that the true scope and spirit of the invention is limited only by the following claims.

What is claimed is:

1. An apparatus for facilitating viewing of an object by human eye, comprising:
    a holder mechanism comprising a support portion having opposing first and second support surfaces;
    at least one light source disposed on said holder mechanism first surface to illuminate at least a portion of the object;
    at least one electronic camera unit disposed on said holder mechanism first surface, said camera being operative to capture at least one image of the object;
    at least one image processor module in electrical communication with said camera unit to format said captured image for display;
    at least one image display device having a display region, said display device disposed on said holder mechanism second surface and in electrical communication with said image processor module to display said formatted image on said display region; and
    at least one user-interface control mechanism disposed on said holder mechanism and in electrical communication with said image processor module for controlling the operations of said module to regulate display of the formatted image by the display device;
    wherein the image processor module comprises at least one processor system in electrical communication with, to receive operational data from, and to control the operations of, at least one of said control mechanism, said camera unit, said light sources and said display device based on a predetermined instruction to adjust at least one of a magnification level, an illumination intensity, an image enhancement and a focusing resolution level of said displayed image;
    wherein said image enhancement includes at least one of an adjustment to contrast and brightness, a noise elimination, a color re-mapping, an inverse video displaying, an illumination equalization mode, image shifting, image stabilization, and image freezing; and
    wherein said illumination equalization mode includes modification of illumination brightness over a selected display area to compensate for a non-ideal positioning of said light source.

2. The apparatus of claim 1 further comprising at least one power source housed in said holder mechanism to provide operational power to at least one of said camera unit, image processor module, light sources and image display device.

3. The apparatus of claim 2 wherein said power source is housed in a handle portion of said holder mechanism wherein said handle portion is connected to said support portion.

4. The apparatus of claim 2 wherein said power source is at least one of a battery unit and an externally connected power source.

5. The apparatus of claim 1 said holder mechanism further comprising at least one handle portion connected to said support portion.

6. The apparatus of claim 5 wherein said handle portion is integrally connected to said support portion.

7. The apparatus of claim 5 wherein said handle portion is pivotally connected to said support portion.

8. The apparatus of claim 5 wherein said control mechanism is disposed on said handle portion.

9. The apparatus of claim 1 wherein said light source portion is rotatably connected to said support portion.

10. The apparatus of claim 1 wherein said camera unit is a charge-coupled device (CCD) camera unit.

11. The apparatus of claim 1 wherein said display device is a liquid crystal display (LCD) device.

12. The apparatus of claim 1 wherein said control mechanism is disposed on said support portion.

13. The apparatus of claim 1 said control mechanism further comprising at least one mode selection device for browsing and selecting at least one operation of said image processor module.

14. The apparatus of claim 13 wherein said mode selection device is a manual input button.

15. The apparatus of claim 13 wherein said mode selection device is a finger operated adjusting rolling switch.

16. The apparatus of claim 13 wherein said mode selection device is a finger operated adjusting sliding switch. switch.

17. The apparatus of claim 13 wherein said mode selection device is a graphic user interface device.

18. The apparatus of claim 13 wherein said mode selection device is a graphic user interface device displayed on a portion of said display region.

19. The apparatus of claim 13 wherein said mode selection device is a voice input device.

20. The apparatus of claim 1 wherein said predetermined instruction is a user-inputted instruction received from said control mechanism.

21. The apparatus of claim 1 wherein said predetermined instruction is said captured image.

22. The apparatus of claim 1 wherein said predetermined instruction is said formatted image.

23. The apparatus of claim 1 wherein said image processing module is a programmable image processing module.

24. The apparatus of claim 1 further comprising:
at least one optical alpha-numeric character recognition module to recognize at least one of a word and a number in said image; and
at least one voice synthesizer module to output patterns corresponding to a pronunciation of said recognized word and number.

25. The apparatus of claim 1 wherein said noise elimination includes filtering of undesired features of said object.

26. The apparatus of claim 1 wherein said inverse video displaying includes display text wherein the colors of text and background are switched.

27. The apparatus of claim 1 wherein said apparatus is a portable apparatus.

* * * * *